United States Patent
Takeda et al.

(10) Patent No.: US 6,794,446 B1
(45) Date of Patent: Sep. 21, 2004

(54) WATER-BORNE URETHANE RESIN COMPOSITION FOR FORMING MICROPOROUS LAYER, METHOD OF PRODUCING FIBROUS SHEET-LIKE COMPOSITE, AND ARTIFICIAL LEATHER

(75) Inventors: Shingo Takeda, Osaka (JP); Hideyuki Takeuchi, Osaka (JP); Eiji Satake, Osaka (JP); Toshifumi Tamaki, Osaka (JP)

(73) Assignee: Dainippon Ink and Chemicals, Inc., Tokyo (JP)

( * ) Notice: Subject to any disclaimer, the term of this patent is extended or adjusted under 35 U.S.C. 154(b) by 263 days.

(21) Appl. No.: 09/889,570

(22) PCT Filed: Feb. 1, 2001

(86) PCT No.: PCT/JP00/00536

§ 371 (c)(1),
(2), (4) Date: Jul. 30, 2001

(87) PCT Pub. No.: WO00/46301

PCT Pub. Date: Aug. 10, 2000

(30) Foreign Application Priority Data

Feb. 1, 1999 (JP) .......................................... 11/024351
Feb. 8, 1999 (JP) .......................................... 11/030659

(51) Int. Cl.$^7$ ............................................. C08L 75/00
(52) U.S. Cl. ...................... 524/590; 524/194; 524/209; 524/240
(58) Field of Search .............................. 524/194, 209, 524/223, 231, 240, 253, 254, 590

(56) References Cited

U.S. PATENT DOCUMENTS

| | | |
|---|---|---|
| 4,079,028 A | 3/1978 | Emmons et al. |
| 4,496,624 A | 1/1985 | McCartney |
| 4,707,400 A | 11/1987 | Towery |
| 4,774,131 A | 9/1988 | Dahmen et al. |
| 5,151,240 A * | 9/1992 | Asano et al. ................ 264/284 |
| 5,518,764 A | 5/1996 | Traubel et al. |
| 5,733,967 A * | 3/1998 | Wicks et al. ................. 524/591 |
| 5,741,828 A * | 4/1998 | Stoy et al. ................... 524/501 |
| 6,040,393 A * | 3/2000 | Vogt et al. ................... 525/454 |
| 6,579,932 B1 * | 6/2003 | Schipper et al. ............. 524/501 |

FOREIGN PATENT DOCUMENTS

| | | |
|---|---|---|
| EP | 0 628 582 A2 | 12/1994 |
| EP | 0 994 136 A1 | 4/2000 |
| JP | 54-80349 | 6/1979 |
| JP | 11-92653 | 4/1999 |

* cited by examiner

Primary Examiner—James J. Seidleck
Assistant Examiner—U. K Rajguru
(74) Attorney, Agent, or Firm—Armstrong, Kratz, Quintos, Hanson & Brooks, LLP (57) ABSTRACT

An object of the present invention is to provide a water-borne urethane resin composition for forming a microporous layer, which is suited for use in a fibrous material substrate, especially an artificial leather, and which has well-defined heat-sensitive coagulation properties and is capable of being uniformly filled into a fibrous material substrate without causing migration, forming a micrporous layer after drying and imparting a feel equivalent to that obtained in a solvent-based urethane resin composition, i.e., an elastic and genuine feel, by impregnating or coating the fibrous material substrate with the water-borne urethane resin composition; a method of producing a fibrous sheet-like composite using the water-borne urethane resin composition; and an artificial leather obtained by the method. The water-borne urethane resin composition of the present invention comprises (1) a water-borne urethane resin having a heat-sensitive coagulation temperature of 40 to 90° C. and (2) an associated type thickener. In the method of producing a fibrous sheet-like composite according to the present invention, (i) a fibrous material substrate is impregnated or coated with (ii) the water-borne resin composition and then (iii) heat-sensitive coagulation is performed using steam.

6 Claims, 1 Drawing Sheet

Fig. 1

WATER-BORNE URETHANE RESIN COMPOSITION FOR FORMING MICROPOROUS LAYER, METHOD OF PRODUCING FIBROUS SHEET-LIKE COMPOSITE, AND ARTIFICIAL LEATHER

TECHNICAL FIELD

The present invention relates to a water-borne urethane resin composition capable of forming a microporous layer. More particularly, the present invention relates to a water-borne urethane resin composition for forming a microporous layer, which is suited for use in a fibrous material substrate, especially an artificial leather, and which has well-defined heat-sensitive coagulation properties and is capable of being uniformly filled into a fibrous material substrate without causing migration, forming a microporous layer after drying and imparting a feel equivalent to that obtained in the case of a solvent-based urethane resin composition, i.e., a genuine and elastic feel by impregnating or coating the fibrous material substrate with the water-borne urethane resin composition.

The present invention also relates to a method of producing a fibrous sheet-like composite, which comprises impregnating or coating a fibrous material substrate with a water-borne urethane resin composition comprising a water-borne urethane resin and a specific thickener and performing heat-sensitive coagulation with steam. More particularly, the present invention relates to a fibrous sheet-like composite, especially an artificial leather, wherein the urethane resin composition, which has well-defined heat-sensitive coagulation properties when coagulated with steam and is uniformly filled into the space between fibers by heat-sensitive coagulation, is capable of forming a microporous layer after drying and also imparting a feel equivalent to that obtained in the case of a solvent-based urethane resin composition, i.e., a genuine and elastic feel.

BACKGROUND ART

As a conventional method of producing an artificial leather, for example, there is known a so-called wet coagulation method of impregnating or coating a fibrous material substrate with an organic solvent solution of a urethane resin and passing the impregnated or coated material substrate through a coagulating solution (usually water) which is a poor solvent to the urethane resin and has compatibility with the organic solvent, thereby to coagulate the solution, followed by washing with water and further drying. However, this method had a disadvantage in that the recovery of an industrially used organic solvent such as dimethylformamide (DMF) is costly because of its high toxicity. To solve these problems, a study has been made to replace an organic solvent-based urethane resin, with which the fibrous material substrate is impregnated or coated, by a water-borne urethane resin. However, an artificial leather having a satisfactory feel and suitable physical properties has never been obtained.

The principal reason thereof is that, where a fibrous material substrate is impregnated with a water-borne urethane resin and dried with heating, water evaporates from the surface of the fibrous material substrate to cause migration wherein migration of water brings migration of the water-borne urethane resin to the surface of the fibrous material substrate. Since the urethane resin migrates to the surface of the fibrous material substrate, as a result of migration, and the fibrous material substrate is scarcely impregnated with the urethane resin therein, the resulting artificial leather has a stiff feel and is likely to be subject to folds and wrinkles. Therefore, various studies have been carried out with the object of preventing migration and the following methods have been suggested.

Examples of the method thereof include (1) a method of adding a heat-sensitive gelling agent and coagulating a synthetic resin emulsion imparted with heat-sensitive coagulation properties in hot water, as disclosed in Japanese Patent Application, Second Publication No. Sho 55-51076; (2) a method of impregnating or coating with a mixed polyurethane emulsion solution, which is prepared by emulsifying with an anionic surfactant to form a urethane resin having a carboxyl group, adding a small amount of a nonionic surfactant later to form a polyurethane emulsion having storage stability and adding a heat-sensitive coagulating agent to the a polyurethane emulsion, and heating the mixed polyurethane emulsion solution with hot air or hot water, thereby to cause heat-sensitive coagulation, as disclosed in Japanese Patent Application, Second Publication No. Sho 59-1823; (3) a method of applying a water-borne resin composition prepared by dissolving inorganic salts in an emulsion emulsified under external forces, and drying the water-borne resin composition with heating, as disclosed in Japanese Patent Application, First Publication No. Hei 6-316877; and (4) a method of forming a foam by heat-sensitive coagulation of a water-borne urethane resin composition containing microballoons and foaming of said microballoons, as disclosed in Japanese Patent Application, Second Publication No. Hei 6-60260.

However, in the method (1), although migration can be prevented, there is a problem that a portion of an impregnating solution flows out and into a coagulation bath to cause coagulation and the coagulated gel adheres again to the surface of the product. There is also a problem that heat-sensitive coagulation properties are lowered with the reduction of the polyurethane resin concentration and the urethane resin is more likely to flow out into hot water. In the method (2), since the resin composition is mainly anionic, the stability of the resin composition is very poor in the case where an inorganic salt (particularly a salt of a divalent or polyvalent metal) of a heat-sensitive coagulation accelerator is used. In the case where drying is performed with hot air, a microporous layer is not formed in the resin in the form of a film and the feel tends to become stiff as the amount of the adhered resin increases. In the case where coagulation is performed with hot water, the same problem arises as in method (1). In the method (3), a microporous layer is not formed, similar to the case of the method (2), because drying is performed with hot air. Since inorganic salts are used in a large amount, inorganic salts remain in the fibers after processing and, therefore, the resulting artificial leather is not suited for practical use as it is. In the method (4), although microballoons are added to form a microporous layer, said microballoons cause coloration due to burning, a stiff feel, and formation of discrete pores having a large pore diameter. Therefore, satisfactory performance such as an acceptable feel and suitable physical properties has not yet been obtained.

As described above, according to the prior art, an artificial leather having a satisfactory feel and physical properties cannot be obtained and also the methods outlined in the prior art cannot attain an objective of the artificial leather of the present invention, wherein the urethane resin after drying forms a microporous layer and imparts a genuine and elastic feel equivalent to that obtained in a solvent-based urethane resin composition.

Figure 1:
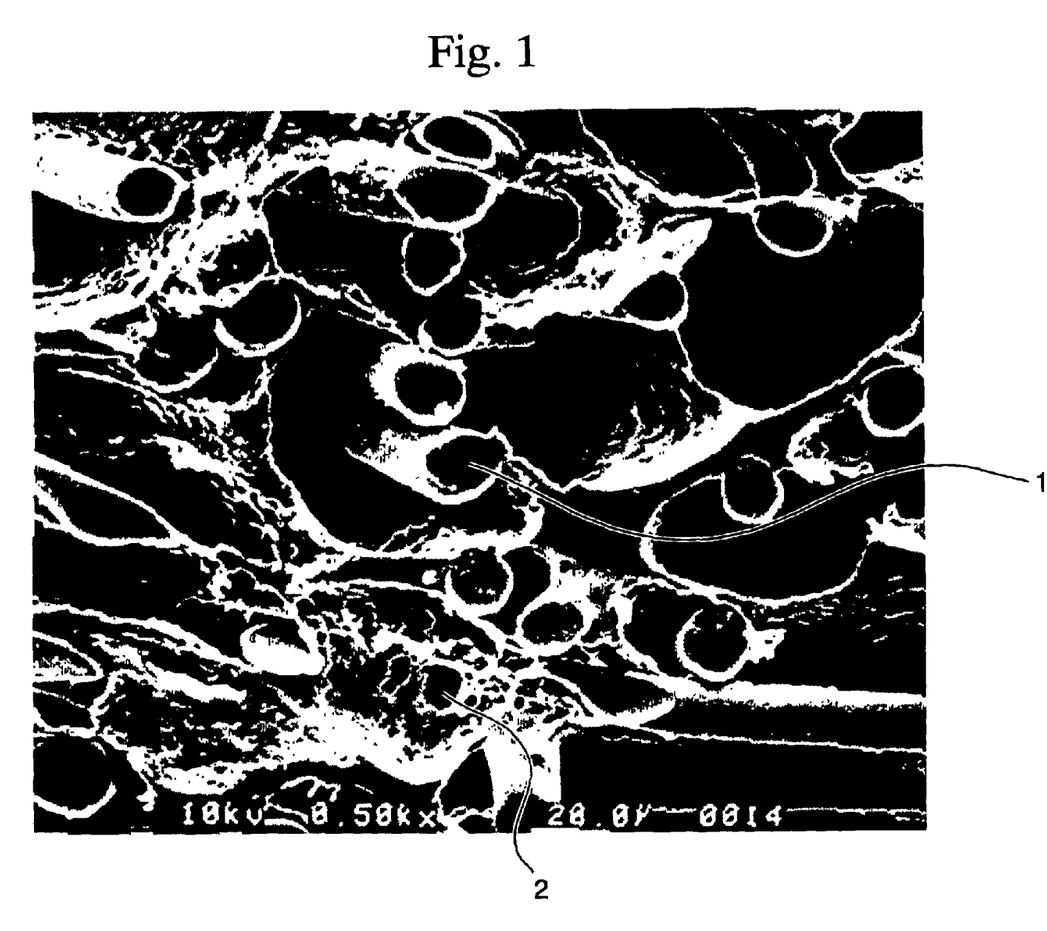
FIG. 1 shows a cross section (magnification of 500) of a processed cloth (fibrous sheet-like composite) in Example 1. It is found that a fibrous material substrate is impregnated with a water-borne urethane resin to form a microporous structure.

The term "microporous" as used herein means the condition where a lot of small pores exist in a dry film of a water-borne urethane resin composition filled into fibers (see FIG. 1).

DISCLOSURE OF THE INVENTION

A first object of the present invention lies in a water-borne urethane resin composition which is stable at normal temperature and has well-defined heat-sensitive coagulation properties, and is capable of being uniformly filled into a fibrous material substrate without causing migration, forming a microporous layer after drying and imparting a feel equivalent to that obtained in a solvent-based urethane resin composition, i.e., an elastic feel, by impregnating or coating the fibrous material substrate with the water-borne urethane resin composition.

A second object of the present invention lies in a method of producing a fibrous sheet-like composite wherein a mixed solution (water-borne resin composition), which has well-defined heat-sensitive coagulation properties when coagulated with steam and is uniformly filled into the space between fibers by heat-sensitive coagulation, is capable of forming a microporous layer after drying and also imparting a feel equivalent to that obtained in a solvent-based urethane resin composition, i.e., an elastic and genuine feel.

The present inventors have conducted exhaustive studies about a urethane resin composition for forming a microporous layer and a fibrous sheet-like composite, especially an artificial leather, which solves the problems described above, and thus completing the present invention.

That is, the present invention provides:

(1) A water-borne urethane resin composition for forming a microporous layer, comprising (1) a water-borne urethane resin having a heat-sensitive coagulation temperature of 40 to 90° C. and (2) an associated type thickener;

(2) A water-borne urethane resin composition for forming a microporous layer as described in (1), wherein said water-borne urethane resin (1) is a urethane resin having a softening temperature of 120 to 240° C.;

(3) A water-borne urethane resin composition for forming a microporous layer as described in (1) or (2), wherein said water-borne urethane resin (1) is a water-borne urethane resin having an average particle diameter of 0.1 to 5 $\mu$m;

(4) A water-borne urethane resin composition for forming a microporous layer as described in any one of (1) to (3), wherein said water-borne urethane resin (1) is a water-borne urethane resin dispersed with a nonionic emulsifier having HLB of 10 to 18;

(5) a water-borne urethane resin composition for forming a microporous layer as described in (4), wherein said nonionic emulsifier has a structure represented by the following structural formula (I):

$$Ra—Ph— \quad (I)$$

wherein R is an alkyl, a $C_1$ to $C_9$ alkyl, aryl or alkylaryl group; a represents an integer of 1 to 3; and Ph represents a phenyl ring residue.

(6) A water-borne urethane resin composition for forming a microporous layer as described in any one of (1) to (5), wherein said associated type thickener (2) has a hydrophobic group located at at least one terminal and also has a urethane bond in a molecular chain;

(7) A water-borne urethane resin composition for forming a microporous layer as described in any one of (1) to (6), wherein said associated type thickener (2) has a structure represented by the following structural formula (I):

$$Ra—Ph— \quad (I)$$

wherein R is a $C_1$ to $C_9$ alkyl, aryl or alkylaryl group; a represents an integer of 1 to 3; and Ph represents a phenyl ring residue;

(8) A water-borne urethane resin composition for forming a microporous layer as described in any one of (1) to (7), wherein said water-borne urethane resin (1) contains (A) a polyoxyalkylene glycol having at least 50% by weight or more of a repeating unit of ethylene oxide and/or (B) a one terminal polyoxyalkylene glycol having at least 50% by weight or more of a repeating unit of ethylene oxide;

(9) A method of producing a fibrous sheet-like composite, which comprises:
(i) impregnating or coating a fibrous material substrate with
(ii) a water-borne resin composition comprising (1) a water-borne urethane resin having a heat-sensitive coagulation temperature of 40 to 90° C. and (2) an associated type thickener, and
(iii) performing heat-sensitive coagulation with steam;

(10) A method of producing a fibrous sheet-like composite as described in (9), wherein said water-borne urethane resin is a water-borne urethane resin dispersed with a nonionic emulsifier having HLB of 10 to 18;

(11) A method of producing a fibrous sheet-like composite as described in (9) or (10), wherein said nonionic emulsifier has a structure represented by the following structural formula (I):

$$Ra—Ph— \quad (I)$$

wherein R is a $C_1$ to $C_9$ alkyl, aryl or alkylaryl group; a represents an integer of 1 to 3; and Ph represents a phenyl ring residue;

(12) A method of producing a fibrous sheet-like composite as described in any one of (9) to (11), wherein said associated type thickener is an associated type thickener which has a hydrophobic group located at at least one terminal and also has a urethane bond in a molecular chain;

(13) A method of producing a fibrous sheet-like composite as described in any one of (9) to (12), wherein said water-borne urethane resin is a water-borne urethane resin which contains (A) a polyoxyalkylene glycol having at least 50% by weight or more of a repeating unit of ethylene oxide and/or (B) a one terminal polyoxyalkylene glycol having at least 50% by weight or more of a repeating unit of ethylene oxide;

(14) A method of producing a fibrous sheet-like composite as described in any one of (9) to (13), wherein the steam temperature is from 70 to 120° C.;

(15) A method of producing a fibrous sheet-like composite as described in any one of (9) to (14), wherein a time for treating with steam is from 10 seconds to 20 minutes;

(16) A method of producing: a fibrous sheet-like composite as described in any one of (9) to (15), which further comprises drying at a temperature of 80 to 150° C. after heat-sensitive coagulation with steam; and (17) An artificial leather obtained by the method of any one of (9) to (16).

The fibrous sheet-like composite wherein the urethane resin composition, which has well-defined heat-sensitive coagulation properties when coagulated with steam and is uniformly filled into the fibrous material substrate by heat-sensitive coagulation, is capable of forming a microporous layer after drying and also imparting a feel equivalent to that obtained in a solvent-based urethane resin composition, i.e., an elastic and genuine feel, as an object of the present invention, can be realized only by a combination of (1) a water-borne urethane resin having a heat-sensitive coagulation temperature of 40 to 90° C., (2) an associated type thickener and (3) heat-sensitive coagulation with steam. The object of the present invention cannot be attained if any one of these constituent factors is absent.

BEST MODE FOR CARRYING OUT THE INVENTION

The water-borne urethane resin having a heat-sensitive coagulation temperature of 40 to 90° C. according to the present invention refers to a water-borne urethane resin which is coagulated in this temperature range. The term "heat-sensitive coagulation temperature" as used herein means a temperature at which a resin solution loses its fluidity and coagulates when a 100 ml glass beaker charged with 50 g of the resin solution is heated gradually with hot water at 95° C. while stirring the resin solution and using a thermometer.

When the heat-sensitive coagulation temperature is lower than 40° C., the stability of the resin itself is poor and causes problems such as formation of a coagulant and occurrence of gelation during storage over summer. On the other hand, when the heat-sensitive coagulation temperature is higher than 90° C., not only do unsatisfactory non-well-defined coagulation properties cause non-uniform impregnation of the resin into the fibers and partial migration, but also high-pressure and high-temperature steam must be used and, therefore, costs associated with these processes rise accordingly. More preferred heat-sensitive coagulation temperature is from 45 to 80° C.

The method of preparing such a water-borne urethane resin may be by any conventionally known method and examples thereof include:
(1) a method of emulsifying a urethane resin using a nonionic emulsifier having specific HLB,
(2) a method of emulsifying and dispersing a urethane prepolymer having an isocyanate group located at at least one terminal using nonionic emulsifier having specific HLB, thereby performing chain elongation with polyamine,
(3) a method of copolymerizing polyethylene glycol described in Japanese Patent Application, First Publication No. Sho 57-39286, and
(4) a method of preparing a water-borne urethane resin containing a heat-sensitive coagulating agent.

Examples of the diisocyanate used in the preparation of the water-borne urethane resin according to the present invention include 2,4-tolylene diisocyanate, 2,6-tolylene diisocyanate, m-phenylene diisocyanate, p-phenylene diisocyanate, 4,4'-diphenylmethane diisocyanate, 2,4'-diphenylmethane diisocyanate, 2,2'-diphenylmethane diisocyanate, 3,3'-dimethyl-4,4'-biphenylene diisocyanate, 3,3'-dimethoxy-4,4'-biphenylene diisocyanate, 3,3'-dichloro-4,4'-biphenylene diisocyanate, 1,5-naphthalene diisocyanate, 1,5-tetrahydronaphthalene diisocyanate, tetramethylene diisocyanate, 1,6-hexamethylene diisocyanate, dodecamethylene diisocyanate, trimethylhexamethylene diisocyanate, 1,3-cyclohexylene diisocyanate, 1,4-cylohexylene diisocyanate, xylylene diisocyanate, tetramethylxylylene diisocyanate, hydrogenated xylylene diisocyanate, lysine diisocyanate, isophorone diisocyanate, 4,4'-dicyclohexylmethane diisocyanate and 3,3'-dimethyl-4,4'-dicyclohexylmethane diisocyanate.

The active hydrogen-containing compound capable of reacting with an isocyanate, which is used in the preparation of the water-borne urethane resin according to the present invention, is classified into a high-molecular active hydrogen-containing compound having preferably an average molecular weight of 300 to 10,000, more preferably 500 to 5,000, and a low-molecular active hydrogen-containing compound having preferably an average molecular weight of 300 or less.

Examples of the high-molecular active hydrogen-containing compound include polyester polyol, polyether polyol, polycarbonate polyol, polyacetal polyol, polyacrylate polyol, polyesteramide polyol and polythioether polyol.

Examples of the polyester polyol include polyesters obtained by the dehydration condensation reaction of a glycol component such as ethylene glycol, propylene glycol, 1,3-propandiol, 1,4-butanediol, 1,5-pentanediol, 3-methyl-1,5-pentanediol, 1,6-hexanediol, neopentyl glycol, diethylene glycol, triethylene glycol, tetraethylene glycol, polyethylene glycol (molecular weight of 300 to 6,000), dipropylene glycol, tripropylene glycol, bishydroxyethoxybenzene, 1,4-cyclohexanediol, 1,4-cyclohexane dimethanol, bisphenol A, hydrogenated bisphenol A, hydroquinone, or an alkylene oxide adduct thereof, and an acid component such as succinic acid, adipic acid, azelaic acid, sebacic acid, dodecanedicarboxylic acid, maleic anhydride, fumaric acid, 1,3-cyclopentanedicarboxylic acid, 1,4-cyclohexanedicarboxylic acid, terephthalic acid, isophthalic acid, phthalic acid, 1,4-naphthalenedicarboxylic acid, 2,5-naphthalenedicarboxylic acid, 2,6-naphthalenedicarboxylic acid, naphthalic acid, biphenyldicarboxylic acid, 1,2-bis(phenoxy)ethane-p,p'-dicarboxylic acid, an anhydride or an ester forming derivative of these dicarboxylic acids, p-hydroxybenzoic acid, p-(2-(hydroxyethoxy)benzoic acid, or an ester forming derivative of these hydroxycarboxylic acids; and polyester polyols obtained by the ring-opening polymerization reaction of a cyclic ester compound such as ε-caprolactone, and copolymer polyesterpolyols thereof.

Examples of the polyether polyol include those obtained by the addition polymerization of one or more monomers such as ethylene oxide, propylene oxide, butylene oxide, styrene oxide, epichlorohydrin, tetrahydrofuran and cyclohexylene in the presence of one or more compounds having at least two active hydrogen atoms, as an initiator, such as ethylene glycol, diethylene glycol, triethylene glycol, propylene glycol, trimethylene glycol, 1,3-butanediol, 1,4-butanediol, 1,5-pentanediol, 1,6-hexanediol, neopentyl glycol, glycerin, trimethylolethane, trimethylolpropane, sorbitol, sucrose, aconite saccharide, trimellitic acid, hemimellitic acid, phosphoric acid, ethylenediamine, diethylenetriamine, triisopropanolamine, pyrogallol, dihydroxybenzoic acid, hydroxyphthalic acid and 1,2,3-propanetriol; and those obtained by the ring-opening polymerization of the above monomers in the presence of a catalyst such as a cation catalyst, proton acid or Lewis acid.

Examples of the polycarbonate polyol include compounds obtained by the reaction between glycol such as 1,4- butanediol, 1,5-pentanediol, 1,6-hexanediol or diethylene glycol, and dimethyl carbonate, diethyl carbonate, ethylene carbonate, diphenyl carbonate or phosgene.

The low-molecular active hydrogen-containing compound includes a compound having at least two active hydrogen atoms in a molecule, which preferably has a molecular weight of 300 or less, for example, a glycol component used as the raw material of the polyester polyol, or a compound such as glycerin, trimethylolethane, trimethylolpropane, sorbitol or pentaerythritol. It further includes a polyamine such as ethylenediamine, 1,2-propanediamine, 1,6-hexamethylenediamine, piperazine, 2-methylpiperazine, 2,5-dimethylpiperazine, isophoronediamine, 4,4'-dicyclohexylmethanediamine, 3,3,'-dimethyl-4,4'-dicyclohexylmethanediamine, 1,2-cyclohexanediamine, 1,4-cyclohexanediamine, aminoethylethanolamine, hydrazines, acid hydrazides, diethyltriamine or triethylenetetramine.

In the water-borne urethane resin of the present invention, there is not any limitation with respect to the composition and structure, except that the heat-sensitive coagulation temperature is from 40 to 90° C. Preferable water-borne urethane resin in the present invention has a softening temperature of at least 100° C. When the softening temperature is lower than 100° C., the microporous layer is inhibited from forming during the drying process and the resulting microporous layer is likely to be deteriorated by water, solvents, wet heat or light and, therefore, it is not preferred. More preferably, it is a water-borne urethane resin having a softening temperature of 120 to 240° C.

The term "softening temperature" as used in the present invention refers to a flow initiation temperature as measured at a heating rate of 3° C./minute under a load of 10 kgf using an orifice having an inner diameter of 1 mm and a length of 1 mm and a Koka-type flow tester.

As the urethane resin having such a softening temperature, a urethane resin having a linear or branched structure can be used and a urethane resin having a branched structure is particularly preferred in the present invention. The branching concentration is preferably within a range from 0.01 to 0.8 mol per 1 kg of the solid content of the urethane resin. When the branching concentration is smaller than 0.01 mol, the resulting microporous layer is likely to be deteriorated due to water, solvent, wet heat or light. On the other hand, when the branching concentration is larger than 0.8 mol, the microporous layer is formed, however, film forming properties between particles are drastically lowered, resulting in poor mechanical strength and durability of the film and, therefore, it is not preferred. More preferably, the branching concentration is within a range from 0.02 to 0.3 mol. Examples of the raw material used to obtain such a branched structure include the above-described polyols and polyamines, which are trifunctional or of higher functionality, or polyfunctional polyisocyanates obtained by modifying the above-described diisocyanates using a conventionally known technique.

The emulsifier having specific HLB (hydrophile-lipophile balance) used in the preparation of the water-borne urethane resin according to the present invention is preferably a nonionic emulsifier having HLB of 10 to 18. The term "HLB" as used herein refers to HLB of the whole nonionic emulsifier finally used. When using a plurality of nonionic emulsifiers, HLB is determined by applying a weight mean to HLB(s) of plural emulsifiers.

As the nonionic emulsifier having HLB of 10 to 18, a conventionally known emulsifier can be used. In order to enable the water-borne urethane resin composition of the present invention to easily form a microporous layer, to impregnate the fibrous material substrate and to impart a feel equivalent to that obtained in a solvent-based urethane resin composition, i.e., an elastic and genuine feel, for a coating, a nonionic emulsifier having a structure represented by the following structural formula (I):

$$R_a-Ph- \quad (I)$$

wherein R is a $C_1$ to $C_9$ alkyl, aryl or alkylaryl group; a represents an integer of 1 to 3; and Ph represents a phenyl ring residue, is preferably used.

Specific examples thereof include polyoxyethylene alkykl phenyl ethers such as polyoxyethylene nonyl phenyl ether, polyoxyethylene dinonyl phenyl ether, polyoxyethylene octyl phenyl ether and polyoxyethylene dioctyl phenyl ether; polyoxyethylene styrenated phenyl ethers such as polyoxyethylene monostyrated phenyl ether, polyoxyethylene distyrenated phenyl ether, polyoxyethylene trisstyrenated phenyl ether, polyoxyethylene monostyrenated methyl phenyl ether, polyoxyethylene distyrenated methyl phenyl ether and a mixture thereof; polyoxyethylene cumyl phenol ether; and polyoxyethylene benzyl phenol ethers such as polyoxyethylene tribenzyl phenol ether. These nonionic emulsifiers may be used alone or in combination.

The amount of the emulsifier is not specifically limited, but is preferably within a range from 1 to 20% by weight, and more preferably from 2 to 10% by weight, based on the solid content of the water-borne urethane resin (1).

Other emulsifiers may be used in combination provided that the effects of the present invention are not adversely affected. Examples of the emulsifier include polyoxyethylene long-chain alkyl ethers such as polyoxyethylene lauryl ether, polyoxyethylene allyl ether and polyoxyethylene oleyl ether; polyoxyethylene sorbitol tetraoleate, or block or random polymers of polyoxyprpylene polyoxyethylene glycol, polyoxypropylene polyoxyethylene adduct of polyamine; fatty acid salts such as sodium oleate; anionic emulsifiers such as alkylsulfate ester salts, alkylbenzenesulfonate salts, alkylsulfosuccinate salts, naphthalenesulfonate salts, sodium alkanesulfonate and sodium alkyl diphenyl ether sulfonate; and nonionic emulsifiers such as polyoxyethyleneakyl sulfate salts and polyoxyethylenealkylphenylsulfate salts.

To obtain the water-borne urethane resin (1) of the present invention, a hydrophilic component can be introduced into the urethane resin, in addition to the emulsifiers described above. The hydrophilic component is particularly preferably a nonionic hydrophilic group. Examples of the raw material used to introduce the nonionic hydrophilic group include nonionic compounds which have at least one active hydrogen atom in a molecule and also have a group consisting of a repeating unit of ethylene oxide and a repeating unit of the other alkylene oxide.

In the water-borne urethane resin (1) of the present invention, particularly preferred nonionic hydrophilic group containing compounds include (A) a polyoxyalkylene glycol containing at least 50% by weight of a repeating unit of ethylene oxide and/or (B) a one terminal polyoxyalkylene glycol containing at least 50% by weight of a repeating unit of ethylene oxide.

Examples of the polyalkylene glycol (A) and one terminal polyoxyalkylene glycol (B) include polyethylene glycol having a molecular weight of 200 to 6,000, or block or random type polyoxyethylene-polyoxypropylene copolymer glycol, polyoxyethylene-polyoxybutylene copolymer glycol, polyoxyethylene-polyoxyalkylene copolymer glycol, and monoalkyl ethers such as methyl ether, ethyl ether and butyl ether thereof.

The content of the polyalkylene glycol (A) and that of the one terminal polyoxyalkylene glycol (B) are preferably within a range from 1 to 10% by weight based on the solid content of the water-borne urethane resin of the present invention.

The water-borne urethane resin having a specific heat-sensitive coagulation temperature used in the present invention is preferably a nonionic water-borne urethane resin, as described above, but a water-borne urethane resin containing a heat-sensitive coagulating agent to impart heat-sensitive coagulation properties can also be used as another embodiment of the present invention.

Examples of the water-borne urethane resin include those having a carboxyl group as a hydrophilic component in a urethane resin structure, in addition to the above-described nonionic water-borne urethane resin.

Examples of the raw material used to introduce the carboxyl group include compounds which have at least one active hydrogen atom in a molecule and also have at least one carboxyl group. Examples of the carboxyl group containing compound include carboxylic acid containing compounds such as 2,2-dimethylolpropionic acid, 2,2-dimethylolbutanoic acid, 2,2-dimethylolvaleric acid, dioxymaleic acid, 2,6-dioxybenzoic acid and 3,4-diaminobenzoic acid, derivatives thereof and polyester polyols obtained by copolymerizing them. Examples of the base used to neutralize these carboxyl groups include nonvolatile bases such as sodium hydroxide and potassium hydroxide; tertiary amines such as trimethylamine, triethylamine, dimethylethanolamine, methyldiethanolamine and triethanolamine; and volatile bases such as ammonia.

It is necessary that the content of the carboxyl group is preferably from 0 to 15, and more preferably from 1 to 10, in terms of an acid value in the solid content of the finally obtained urethane resin. When the acid value exceeds 15, satisfactory heat-sensitive coagulation properties are not obtained and the mixing stability becomes poor and, furthermore, resistance such as water resistance is lowered and, therefore, it is not preferred.

Examples of the heat-sensitive coagulating agent used in the present invention include sodium silicofluoride, potassium silicofluoride; an ammonium salt of hydrochloric acid, nitric acid, sulfuric acid and phosphoric acid, polyvalent metal salts such as salts of sodium, potassium, magnesium, zinc, barium, nickel, tin, lead, iron and aluminum; polymer compounds having a methyl ether group which is soluble in cold water and insoluble in warm water, such as cellulose methyl ether and polyvinyl methyl ether; polyether thioether glycols, polyether-modified polydimethylsiloxane compound; alkylene oxide adduct of alkyl phenol-formalin adduct, and polyether urethanes described in Japanese Patent Application, First Publication Sho 51-127142, Japanese Patent Application, First Publication Sho 51-63841 and Japanese Patent Application, First Publication Sho 60-65015. These heat-sensitive coagulating agents may be used alone or in combination.

Such a heat-sensitive coagulating agent may be added during or after the preparation of the water-borne urethane resin, or may be added simultaneously when an associated thickener (2) is incorporated.

The water-borne urethane resin (1) (containing the urethane prepolymer (2) having an isocyanate group located at at least one terminal) according to the present invention is prepared by a conventionally known method. In the case of the urethane resin, the diisocyanate and the active hydrogen-containing compound (containing a hydrophilic component) are reacted in an equivalent ratio of an isocyanate group to an active hydrogen group of preferably from 0.8:1 to 1.2:1, and more preferably from 0.9:1 to 1.1:1. In the case of the urethane prepolymer having an isocyanate located at at least one terminal, the diisocyanate and the active hydrogen-containing compound (containing a hydrophilic component) are reacted in an equivalent ratio of preferably from 1.1:1 to 3:1, more preferably from 1.2:1 to 2:1, preferably at 20 to 120° C., more preferably at 30 to 100° C.

These reactions can be carried out in the absence of a solvent, but an organic solvent can also be used for the purpose of controlling the reaction of the reaction system or reducing the viscosity. Examples of the organic solvent include, but are not limited to, aromatic hydrocarbons such as toluene and xylene; ketones such as acetone and methyl ethyl ketone; ethers such as tetrahydrofuran; acetates such as ethyl acetate and butyl acetate; and amides such as dimethylformamide and N-methylpyrrolidone. It is preferred to use those having a comparatively low boiling point and which can be easily removed by distillation.

The water-borne urethane resin (1) (containing the urethane prepolymer (2) having an isocyanate group located at at least one terminal) is dispersed in water by a conventionally known method using the above-described nonionic surfactant. When using the urethane prepolymer having an isocyanate group located at at least one terminal, chain elongation is carried out by polyamine or water after dispersing in water.

Where a carboxyl group, as a hydrophilic component, is introduced into the urethane resin or urethane prepolymer having an isocyanate group located at at least one terminal, the water-borne urethane resin is neutralized with the neutralizer before, during or after the urethane reaction or before dispersing in water, and then dispersed in water.

The water-borne urethane resin (1) of the present invention preferably has an average particle diameter of 0.1 $\mu$m or more to provide penetration into the fibrous material substrate and well-defined heat-sensitive coagulation properties due to use in combination with the associated type thickener and to form a tough microporous layer after drying. When the average particle diameter is 0.1 $\mu$m or less, migration occurs and the ability to form a microporous layer is lowered and, therefore, it is not preferred. More preferably, the average particle diameter is within a range from 0.15 to 5 $\mu$m. The term "average particle diameter" used herein means a median diameter as measured in accordance with a volume standard of a laser diffraction/scattering type particle size distribution measuring apparatus LA-910 (manufactured by Horiba, Ltd.).

When using an organic solvent in the reaction, the organic solvent is finally removed from the water-borne urethane resin (1) thus obtained by distillation under reduced pressure and the water-borne urethane resin is used as a water-borne urethane resin which is substantially free from the organic solvent.

In the preparation of the water-borne urethane resin (1) of the present invention, various aqueous dispersions and water dispersions, for example, vinyl acetate, ethylene-vinyl acetate, acrylic and acrylic-styrene emulsions, styrene-butadiene, acrylonitrile-butadiene and acrylic-butadiene latexes, polyethylene and polyolefin ionomers, and polyurethane, polyester, polyamide and epoxy aqueous dispersions and water dispersions may be used in combination, in addition to water, provided that the effects of the present invention are not adversely affected.

The water-borne urethane resin (1) obtained by removing the organic solvent is an aqueous dispersion, which is substantially free from a solvent, the solid content of which is from about 10 to 60% by weight, and preferably from 15 to 50% by weight. In case an organic solvent having a boiling point of 100° C. or higher must be used in the preparation of the water-borne urethane resin, the amount of the organic solvent should be controlled to 20% by weight or less based on the total weight of the aqueous dispersion.

The associated type thickener (2) used in the present invention is an indispensable component to impart well-defined heat-sensitive coagulation properties when coagulated with steam, and to enable the water-borne resin composition to be filled uniformly into the fibrous material substrate by means of heat-sensitive coagulation to form a microporous layer after drying and to impart a feel equivalent to that obtained in a solvent-based urethane resin composition, i.e., an elastic feel, by impregnating or coating the fibrous material substrate with the water-borne urethane resin composition. Such an associated type thickener is publicly known and examples thereof include urethane associated type thickeners described in Japanese Patent Publication, First Publication No. Sho 54-80349, Japanese Patent Publication, First Publication No. Sho 58-213074, Japanese Patent Publication, First Publication No. Sho 60-49022, Japanese Patent Publication, Second Publication No. Sho 52-25840, Japanese Patent Publication, First Publication No. Hei 9-67563 and Japanese Patent Publication, First Publication No. Hei 9-71766; associated type thickeners obtained by copolymerizing nonionic urethane monomers described in Japanese Patent Publication, First Publication No. Sho 62-292879 and Japanese Patent Publication, First Publication No. Hei 10-121030, as an associated monomer, with the other acrylic monomer; and associated type thickener having an amino-plast structure described in WO 9640815.

Examples of the commercially available products of these associated type thickeners include RHEOLATE 216 and 266 manufactured by RHEOX Co.; Schwego Pur 8020 and Pur 8050 manufactured by Bernd Schwegmann Co.; Tafigel PUR 40, PUR 45 and PUR 60 manufactured by MUNZING CHEMIE GMBH; Collacral PU 85 manufactured by BASF Co.; BORCHIGEL L75N manufactured by Hoechst AG; Primal QR-708, RM-825, RM-870, RM-1020, RM-2020NPR, SCT-200, SCT-270, RM-8W, RM-4 and TT-935 manufactured by Rohm and Haas, Ltd.; DK Thickener SCT-275 manufactured by DAI-ICHI KOGYO SEIYAKU CO,. LTD.; ADEKANOL UH-420, UH-540, UH-550 and UH-750 manufactured by ASAHI DENKA KOGYO KK; SN Thickener 603, 612, A-803, A-812 and A-814 manufactured by Sannopco Co., Ltd.; ELEMINOL N62 and VISRIZER AP-2 manufactured by Sanyo Chemical Industries, Ltd.; and OPTIFLO L150, M210 and H400 manufactured by Sud-Chemie.

Among these associated type thickeners, an associated type urethane thickener, which has a hydrophobic group located at at least one terminal and has a urethane bond in a molecular chain, is preferred. Specific examples thereof include associated type thickeners having the following structural formula or a reaction mixture thereof.

R1—X-(PEG-X-R2—X)m-PEG-X—R1'    (II)

wherein R1, R1' each represents a $C_8$ to $C_{36}$ alkyl group or a hydrocarbon group having an aromatic ring and may be the same or different; R2 represents a $C_6$ to $C_{36}$ diisocyanate residue, excluding a NCO group; X represents a urethane bond; PEG represents a polyethylene glycol residue having a molecular weight of 1,500 to 33,000; and m represents an integer of 0 or more R1—Y—R2-(X-PEG-X—R3)m-X-PEG-X—R2—Y—R1'    (III)

wherein R1, R1' each represents a $C_8$ to $C_{36}$ alkyl group or a hydrocarbon group having an aromatic ring and may be the same or different; R2 and R3 each represents a $C_6$ to $C_{36}$ diisocyanate residue, excluding a NCO group and may be the same or different; X represents a urethane bond; Y represents a urethane bond or an urea bond; PEG represents a polyethylene glycol residue having a molecular weight of 1,500 to 33,000; and m represents an integer of 0 or more R1-(OA)p-X—R2-(X-PEG-X—R3)m-X-(AO)q-R1'    (IV)

wherein R1, R1' each represents a $C_8$ to $C_{36}$ alkyl group or a hydrocarbon group having an aromatic ring and may be the same or different; R2 and R3 each represents a $C_6$ to $C_{36}$ diisocyanate residue, excluding a NCO group and may be the same or different; X represents a urethane bond; A represents a $C_2$ to $C_4$ hydrocarbon residue, which contains at least ethylene; m represents an integer of 0 or more; and p and q each represents an integer of 1 to 200 and may be the same or different $$\begin{array}{c}(R1\!-\!\!-\!(OA)p\!-\!X)i\\ \diagdown\\ (R1'\!-\!(OA)q\!-\!X)j\!-\!R4\\ \diagup\\ (R1''\!-\!(OA)r\!-\!X)k\end{array}\qquad(V)$$

wherein R1, R1' and R1" each represents a $C_8$ to $C_{36}$ alkyl group or a hydrocarbon group having an aromatic ring and may be the same or different; R4 represents a polyfunctional polyisocyanate residue, excluding a NCO group; A represents a $C_2$ to $C_4$ hydrocarbon residue, which contains at least ethylene; X represents a urethane bond; i, j and k each represents an integer of 0 or more and (i+j+k) is an integer of 3 or more; and p, q and r each represents an integer of 1 to 200 and may be the same or different $$\begin{array}{c}(R1\!-\!\!-\!(OA)p\!-\!X)i\\ \diagdown\\ (R1'\!-\!(OA)q\!-\!X)j\!-\!R4\\ \diagup\\ (R1''\!-\!\!-\!Y)k\end{array}\qquad(VI)$$

wherein R1, R1' and R1" each represents a $C_8$ to $C_{36}$ alkyl group or a hydrocarbon group having an aromatic ring and may be the same or different; R4 represents a polyfunctional polyisocyanate residue, excluding a NCO group; A represents a $C_2$ to $C_4$ hydrocarbon residue, which contains at least ethylene; X represents a urethane bond; Y represents a urethane bond or a urea bond; i, j and k each represents an integer of 0 or more and (i+j+k) is an integer of 3 or more; and p and q each represents an integer of 1 to 200 and may be the same or different $$\begin{array}{c}(R1\!-\!X\!-\!\!-\!(OA)p)i\\ \diagdown\\ (R1'\!-\!X\!-\!\!-\!(OA)q)j\!-\!R5\\ \diagup\\ (R1''\!-\!X\!-\!\!-\!(OA)r)k\end{array}\qquad(VII)$$

wherein R1, R1' and R1" each represents a $C_8$ to $C_{36}$ alkyl group or a hydrocarbon group having an aromatic ring and may be the same or different; R5 represents polyfunctional polyol or polyamine group, excluding active hydrogen; A represents a $C_2$ to $C_4$ hydrocarbon residue, which contains at least ethylene; X represents a urethane bond; i, j and k each represents an integer of 0 or more and (i+j+k) is an integer of 3 or more; and p, q and r each represents an integer of 1 to 200 and may be the same or different In order to make heat-sensitive coagulation properties of the water-borne urethane resin composition of the present invention well-defined and to enable the water-borne urethane resin composition to easily form a microporous layer and to impart a feel equivalent to that obtained in the case of a solvent-based urethane resin composition, i.e., an elastic and genuine feel, by impregnating or coating the fibrous material substrate, a hydrophobic group of the associated type thickener located at at least one terminal preferably has a structure represented by the following structural formula (I):

$$R_a\text{—}Ph\text{—} \tag{I}$$

wherein R is a $C_1$ to $C_9$ alkyl, aryl or alkylaryl group; a represents an integer of 1 to 3; and Ph represents a phenyl ring residue, is preferably used.

Specific examples thereof include an alkylphenyl group such as nonylphenyl, dinonylphenyl, octylphenyl or dioctylphenyl; a styrenated phenyl group such as monostyrenated phenyl, distyrenated phenyl, tristyrenated phenyl, monostyrenated phenyl, distyrenated phenyl or a mixture thereof; a benzylphenyl group such as tribenzylphenyl; and a p-(α-cumyl)phenyl group. These groups may be used alone or in combination.

It is necessary that the amount of the associated type thickener is within a range from 0.1 to 20 parts by weight, and preferably from 0.3 to 10 parts by weight, based on 100 parts by weight of the solid content of the water-borne urethane resin. When the amount of the associated type thickener is less than 0.1 parts by weight, well-defined heat-sensitive coagulation properties cannot be obtained in heat-sensitive coagulation with steam and, moreover, the water-borne resin composition filled into the fibrous material substrate by heat-sensitive coagulation is not capable of forming a microporous layer after drying and imparting a feel equivalent to that obtained in the case of a solvent-based urethane resin composition, i.e., an elastic and genuine feel, by impregnating or coating the fibrous material substrate. On the other hand, when the amount exceeds 20 parts by weight, heat-sensitive coagulation properties are improved, thereby accelerating the formation of a microporous layer and improving the genuine feel, however, the water resistance is lowered and the feel becomes too stiff by impregnating or coating the fibrous material substrate. Therefore, it is not preferred.

Thus, the water-borne urethane resin composition of the present invention can be obtained by mixing (1) a water-borne urethane resin having a heat-sensitive coagulation temperature of 40 to 90° C. with (2) an associated type thickener, sufficiently uniformly, at a temperature lower by far than the heat-sensitive coagulation temperature of the water-borne urethane resin. Alternatively, the associated type thickener can be added during the preparation of the water-borne urethane resin. In that case, the water-borne urethane resin composition is prepared at a temperature lower by far than the heat-sensitive coagulation temperature of the water-borne urethane resin containing the associated type thickener, as a matter of course.

Provided that the heat-sensitive coagulation properties and formation of the microporous layer in the present invention are not adversely affected, other aqueous dispersions, for example, vinyl acetate, ethylene-vinyl acetate, acrylic and acrylic-styrene emulsions, styrene-butadiene, acrylonitrile-butadiene and acrylic-butadiene latexes, polyethylene and polyolefin ionomers, and polyurethane, polyester, polyamide and epoxy aqueous dispersions can be incorporated into the water-borne urethane resin composition of the present invention.

In addition to the above-described aqueous dispersions, film forming agents such as alkylene glycol derivative, dialkyl ester of aliphatic dicarboxylic acid, and N-methylpyrrolidone may be added for the purpose of improving film forming properties and, moreover, various leveling agents and penetrating agents such as a fluorine leveling agent, a dialkyl sulfosuccinate emulsifier and an acetylene glycol derivative may be incorporated for the purpose of improving processability. For the purpose of imparting processability to assist mechanical foaming, blowing agents such as ammonium stearate, metal salts of a higher fatty acid, and dialkyl sulfosuccinate emulsifier may be incorporated. Alternatively, for the purpose of inhibiting foaming of the mixed solution, various defoamers such as mineral oil, amide and silicone and a small amount of alcohols such as ethanol and isopropyl alcohol can be incorporated.

For the purpose of coloring, various water-soluble or water-dispersible inorganic or organic pigments can be incorporated and, moreover, inorganic fillers such as calcium carbonate, talc, aluminum hydroxide, silica and glass fiber and organic fillers such as cellulose powder, protein powder, silk powder and inorganic short fibers can also be incorporated. For the purpose of improving various resistances such as light resistance, heat resistance, water resistance and solvent resistance, stabilizers such as antioxidants, ultraviolet absorbers and hydrolysis inhibitors can be added during or after the preparation. Alternatively, crosslinking agents such as epoxy resin, melamine resin, isocyanate compound, aziridine compound, polycarbodiimide compound and oxazoline compound can also be incorporated.

The fibrous material substrate is preferably impregnated or coated with the water-borne resin composition used in the present invention after finally adjusting the resin solid content to 5 to 50% by weight, and more preferably 10 to 40% by weight, and then heat-sensitive coagulation is performed with steam.

Finally, the resin solid content of the water-borne urethane resin composition of the present invention is adjusted to have a resin solid content of 5 to 50% by weight, and more preferably 10 to 40% by weight.

Since the water-borne urethane resin composition of the present invention has excellent stability at normal temperatures as well as well-defined heat-sensitive coagulation properties and microporous layer forming properties, various fibrous material substrates such as papers, nonwoven fabrics and knitted fabrics consisting of natural fibers, synthetic fibers and inorganic fibers are impregnated or coated with the water-borne urethane resin composition, and thus imparting a feel equivalent to that obtained in the case of a solvent-based urethane resin composition, i.e., an elastic and genuine feel.

A microporous layer of the water-borne urethane resin composition of the present invention can be obtained by applying the water-borne urethane resin composition to the substrate, heating to a temperature higher than the heat-sensitive coagulation temperature of the water-borne urethane resin composition by means of hot air, warm water, steam, infrared rays, electromagnetic waves or high frequency waves, and evaporating water. To exhibit the preferred characteristics of the water-borne urethane resin composition of the present invention to the highest degree possible, the heat-sensitive coagulation method using steam or electromagnetic waves is particularly preferred.

Thus, the water-borne urethane resin composition of the present invention is used in the manufacture of shoes, bags, clothes, furniture (e.g. chairs, sofas, etc.), automotive interiors (e.g. vehicle seats, steering etc.), various synthetic leathers (e.g. moisture-permeable waterproofing material, etc.), artificial leathers, abrasives, core materials for felt pens, and treating agents for various cast products.

In the method of preparing the fibrous sheet-like composite of the present invention, as the fibrous material substrate to be impregnated or coated with the above-described water-borne urethane resin, any nonwoven fabric or knitted fabric, which has conventionally been used in the preparation of the fibrous material substrate, may be used without limitation. For the purpose of reinforcement, the knitted fabric may be laminated in or on the surface of the nonwoven fabric. The constituent fibers may be either natural fibers or chemical fibers and examples of natural fibers include cotton, wool, silk and asbestos fibers, while examples of synthetic fibers include regenerated fibers such as rayon and tencel fibers; semisynthetic fibers such as acetate and triacetate fibers; and synthetic fibers such as polyamide, polyester, polyolefin and acrylic fibers. Fibers consisting of a mixture thereof can also be used. To obtain a fibrous material sheet-like composite having a good feel, ultra fine fibers are preferably used. The ultra fine fibers may be either of sea-island type, division type, peeling type or direct-spinning type fibers. The method of thinning sea-island fibers includes dissolution by treatment with a solvent such as toluene or decomposition using an alkali, but is not specifically limited.

The method of impregnating and coating the fibrous material substrate with the water-borne resin composition of the present invention may be any conventionally used method, and examples thereof include impregnation using a mangle or coating using a knife coater, a roll coater, an airknife coater or a spray coater. The amount (solid content) of the urethane resin is preferably from 3 to 100 parts by weight based on 100 parts of the substrate of the fibrous material in the case of impregnation. In the case of coating, the coating thickness is preferably 0.1 to 10 mm. It is preferred that napping of the surface of the fibrous sheet-like composite obtained by the present invention is inhibited and coating is conducted after impregnation so as to impart surface smoothness and cushioning properties.

During the impregnation or coating, blowing agents such as ammonium stearate, metal salts of a higher fatty acid, and dialkyl sulfosuccinate emulsifier can be added to the water-borne resin composition of the present invention, thereby mechanically foaming the water-borne resin composition. In the case of coating, it becomes possible to form a foamed layer having good cushioning properties. Also in the case of impregnation, the resulting fibrous sheet-like composite has a very soft feel regardless of the small amount of the water-borne resin composition and, therefore, it is preferred.

The heat-sensitive coagulation with steam in the present invention can be conducted by adjusting the steam temperature to a temperature higher than the heat-sensitive gelation temperature of the water-borne resin composition. To prepare more stably, the steam temperature is preferably adjusted to a temperature which is 10° C. higher than the heat-sensitive gelation temperature, and is usually from 60 to 140° C. In view of economy and efficiency, the steam temperature is particularly preferably from 70 to 120° C. The humidity is preferably about 100% because this inhibits surface drying. The time of the treatment with steam is preferably from several minutes to about 30 minutes, and more preferably from 10 seconds to 20 minutes.

The method of coagulating with steam can be used in combination with other methods. Examples of other methods are methods of coagulating using infrared rays, electromagnetic waves and high frequency waves.

The processed cloth coagulated with steam employing the method of the present invention is then dried with heating. A variety of drying methods may be employed, for example, drying with heating using hot air, infrared rays, electromagnetic waves, high frequency waves, a cylinder or the like. Generally, a method of drying with heating using hot air is preferred because of its low cost in terms of equipment investment and associated running costs. The drying temperature may be a temperature at which the processed cloth is not deteriorated due to heat and the water-borne resin composition in the fibrous material is sufficiently dried to form a film, and is preferably from 80 to 150° C.

The fibrous sheet-like composite obtained by the above method according to the present invention may be subjected to a soaping treatment with warm or hot water as a post-treatment. According to this soaping process, the nonionic emulsifier contained in the water-borne urethane resin of the present invention as well as inorganic salts and heat-sensitive coagulating agents used to accelerate heat-sensitive coagulation are extracted and removed so that not only the microporous structure of the finally obtained fibrous sheet-like composite becomes finer, but also the soaping process can serves as both a dyeing process of the fibrous sheet-like composite and a thinning process of ultra fine fibers when using ultra fine fibers.

In the soaping process, a water-soluble polymer such as poval or gelatin may be added for the purpose of forming a finer microporous structure provided the heat-sensitive coagulation properties of the present invention are not adversely affected.

The fibrous sheet-like composite thus obtained by the present invention is used in the manufacture of shoes, bags, clothes, furniture (e.g. chairs, sofas, etc.), automotive interiors (e.g. vehicle seats, steering etc.), various synthetic leathers (e.g. moisture-permeable waterproofing material, etc.), artificial leathers, abrasives and core materials for felt pens, and is particularly suited for use as artificial leathers.

The fibrous sheet-like composite of the present invention can be used for various purposes described above as it is. According to a preferred embodiment of the present invention, the fibrous sheet-like composite of the present invention can be optionally provided with an intermediate foamed layer, a skin layer and an adhesive layer to form an artificial leather coated with silver. Alternatively, the fibrous sheet-like composite may be used after treating the surface with a coating. Furthermore, the artificial leather can be subjected to a surface finishing treatment or a rubbing treatment.

EXAMPLES

The following Examples further illustrate the present invention in detail, but the present invention is not limited to the Examples. In the Examples, "parts" are by weight unless otherwise indicated.

Synthesis Example of Water-borne Polyurethane Resin

Synthesis Example A

500 Parts of polytetramethylene glycol having a molecular weight of 1,000, 10.0 parts of 1,4-butanediol, 10.9 parts of trimethylolpropane, 48.2 parts of polyethylene glycol having a molecular weight of 600 and 235.0 parts of isophorone diisocyanate were reacted at 70° C. in 433 parts of methyl ethyl ketone in the presence of 0.2 parts of dibutyltin laurate until the NCO content reached 1.7% to obtain a urethane prepolymer having an isocyanate group located at at least one terminal. This urethane prepolymer was mixed with 1254 parts of an aqueous emulsifier solution prepared by dissolving 48.2 parts of polyoxyethylene distyrenated phenyl ether (HLB=14) and the mixture was emulsified and dispersed by a homomixer, and then 206 parts of a chain extender solution prepared by dissolving 20 parts of anhydrous piperazine was added, to thereby perform chain elongation. Then, methyl ethyl ketone was distilled off under reduced pressure to obtain a water-borne urethane resin A having a solid content of 40%, an average particle diameter of 0.3 μm and a heat-sensitive coagulation temperature of 48° C. The softening temperature of the dry film was 195° C.

Synthesis Example B

500 Parts of polyester having a molecular weight of 1,000 of 1,4-butanediol/adipic acid, 14.7 parts of trimethylolpropane, 40.8 parts of polyethylene glycol monomethyl ether having a molecular weight of 1,000 and 256.8 parts of 4,4'-diphenylmethane diisocyanate were reacted at 80° C. in 348 parts of toluene until the NCO content reached 2.5% to obtain a urethane prepolymer having an isocyanate group located at at least one terminal. This urethane prepolymer was mixed with 894 parts of an aqueous emulsifier solution prepared by dissolving 40.6 parts of polyoxyethylene nonyl phenyl ether (HLB=16) and 40.6 parts of polyoxyethylene nonyl phenyl ether (HLB=12) and the mixture was emulsified and dispersed by a homomixer, and then 260 parts of a chain extender solution prepared by dissolving 26 parts of anhydrous piperazine was added, to thereby perform chain elongation. Then, toluene was distilled off under reduced pressure to obtain a water-borne urethane resin B having a solid content of 50%, an average particle diameter of 1.5 μm and a heat-sensitive coagulation temperature of 62° C. The softening temperature of the dry film was 210° C.

Synthesis Example C

500 Parts of polytetramethylene glycol having a molecular weight of 1,300, 15.3 parts of 1,4-butanediol, 11.1 parts of trimethylolpropane, 39.4 parts of polyethylene glycol having a molecular weight of 600 and 233.4 parts of isophorone diisocyanate were reacted at 70° C. in 425 parts of methyl ethyl ketone in the presence of 0.2 parts of dibutyltin laurate until the NCO content reached 1.8% to obtain a urethane prepolymer having an isocyanate group located at at least one terminal. This urethane prepolymer was mixed with 1239 parts of an aqueous emulsifier solution prepared by dissolving 55.2 parts of polyoxyethylene distyrenated phenyl ether (HLB=14) and the mixture was emulsified and dispersed by a homomixer, and then 220 parts of a chain extender solution prepared by dissolving 22 parts of anhydrous piperazine was added, to thereby perform chain elongation. Then, methyl ethyl ketone was distilled off under reduced pressure to obtain a water-borne urethane resin C having a solid content of 40%.

The softening temperature of a water-borne urethane resin was 52° C.

Synthesis Example D

500 Parts of polyester having a molecular weight of 1,000 of 1,4-butanediol/adipic acid, 18.5 parts of polyester having a molecular weight of 2,000 of 1,4-butanediol/adipic acid, 16.5 parts of trimethylolpropane, 34.1 parts of polyethylene glycol monomethyl ether having a molecular weight of 1,000 and 284.6 parts of 4,4'-diphenylmethane diisocyanate were reacted at 80° C. in 366 parts of toluene until the NCO content reached 2.9% to obtain a urethane prepolymer having an isocyanate group located at at least one terminal. This urethane prepolymer was mixed with 939 parts of an aqueous emulsifier solution prepared by dissolving 42.7 parts of polyoxyethylene nonyl phenyl ether (HLB=16) and 42.7 parts of polyoxyethylene nonyl phenyl ether (HLB=12) and the mixture was emulsified and dispersed by a homomixer, and then 330 parts of a chain extender solution prepared by dissolving 33 parts of anhydrous piperazine was added, to thereby perform chain elongation. Then, toluene was distilled off under reduced pressure to obtain a water-borne urethane resin D having a solid content of 50%.

The softening temperature of the dry film was 60° C.

Synthesis Example of Associated Type Thickener

Synthesis Example a

600 Parts of polyethylene glycol having a molecular weight of 8,000 and 133 parts of an ethylene oxide (12 mol) adduct of distyrenated methylphenol were charged and, after hydrating at 105° C. under reduced pressure, 37 parts of isophorone diisocyanate was added. The mixture was reacted at 80 to 90° C. for four hours and the reaction product was dissolved in water to obtain an associated type thickener a having a solid content of 20%.

Synthesis Example b

500 Parts of polyethylene glycol having a molecular weight of 6,000 and 234 parts of an ethylene oxide (17 mol) adduct of nonylphenol were charged and, after hydrating at 105° C. under reduced pressure, 35 parts of hexamethylene diisocyanate was added. The mixture was reacted at 80 to 90° C. for four hours and the reaction product was dissolved in water to obtain an associated type thickener b having a solid content of 20%.

Example 1

50 Parts of a water-borne urethane was mixed with an aqueous solution prepared by previously dissolving 2 parts of an associated type thickener a in 48 parts of water to prepare a water-borne resin composition having a urethane resin concentration of 20%. A nonwoven fabric having a weight of 300 g/m$^2$, consisting of polyester fibers, was impregnated with this water-borne urethane resin composition and then squeezed by a mangle so that a wet pick-up becomes 250%. The nonwoven fabric impregnated with the water-borne urethane resin composition was allowed to stand in saturated water vapor at 100° C. for two minutes and then dried in a drier at 100° C. for 20 minutes. This water-borne urethane resin composition was stable even after standing at normal temperatures for one month.

FIG. 1 shows a cross section of a processed cloth (fibrous sheet-like composite) in Example 1 (magnification of 500). In FIG. 1, the reference symbol 1 denotes fibers and 2 denotes a microporous layer. It is found that the fibrous material is impregnated with a water-borne urethane resin to form a microporous structure.

Example 2

In the same manner as in Example 1, except that an associated type thickener b was used, a water-borne urethane resin composition was prepared and then processing was carried out in the same manner as in Example 1. This water-borne urethane resin composition was stable even after standing at normal temperatures for one month.

Example 3

In the same manner as in Example 1, except that a water-borne urethane resin B was used, a water-borne urethane resin composition was prepared and then processing was carried out in the same manner as in Example 1. This water-borne urethane resin composition was stable even after standing at normal temperatures for one month.

Example 4

In the same manner as in Example 2, except that a water-borne urethane resin B was used, a water-borne urethane resin composition was prepared and then processing was carried out in the same manner as in Example 2. This water-borne urethane resin composition was stable even after standing at normal temperatures for one month.

Comparative Example 1

Processing was carried out in the same manner as in Example 1, except that VONDIC 1850NS (DAINIPPON INK & CHEMICALS Co., Ltd., heat-sensitive coagulation temperature of 100° C. or higher) was used as the water-borne urethane resin.

Comparative Example 2

Processing was carried out in the same manner as in Example 1, except that no associated type thickener was added.

Comparative Example 3

50 Parts of a water-borne urethane resin A was mixed with an aqueous solution prepared by previously dissolving 2 parts of an alkali-soluble acrylic thickener VONCOAT HV (DAINIPPON INK & CHEMICALS Co., Ltd.) in 47 parts of water and further adding 1 part of 28% ammonia water thereby thickening the solution to prepare a water-borne urethane resin composition, and then processing was carried out in the same manner as in Example 1. This water-borne urethane resin composition was stable even after standing at normal temperatures for one month. These evaluation results are shown in the following tables.

TABLE 1

|  | Example 1 | Example 2 | Example 3 | Example 4 |
|---|---|---|---|---|
| Water-borne urethane resin | Synthesis Example A | Synthesis Example A | Synthesis Example B | Synthesis Example B |
| Heat-sensitive coagulation temperature (° C.) | 48 | 48 | 62 | 62 |
| Thickener | Synthesis Example a | Synthesis Example b | Synthesis Example a | Synthesis Example b |
| Standing stability of water-borne urethane resin composition | good | good | good | good |
| Coagulation method | steam | steam | steam | steam |
| Presence or absence of migration | ○ | ○ | ○ | ○ |
| Formation of porous layer | ○ | ○ | ○ | ○ |
| Feel of processed cloth | ⊚ | ⊚ | ⊚ | ⊚ |

TABLE 2

|  | Comp. Example 1 | Comp. Example 2 | Comp. Example 3 |
|---|---|---|---|
| Water-borne urethane resin | 1850 NS | Synthesis Example A | Synthesis Example A |
| Heat-sensitive coagulation temperature (° C.) | >100 | 48 | 48 |
| Thickener | Synthesis Example a | none | HV/ammonia |
| Standing stability of water-borne urethane resin composition | good | good | good |
| Coagulation method | steam | steam | steam |
| Presence or absence of migration | x | ○ | ○ |
| Formation of porous layer | x | x | x |
| Feel of processed cloth | x | Δ | x |

Example 5

50 Parts of a water-borne urethane C was mixed with an aqueous solution prepared by previously dissolving 2 parts of an associated type thickener ELEMINOL N62 (manufactured by Sanyo Chemical Industries, Ltd.) in 48 parts of water to prepare a water-borne resin composition having a urethane resin concentration of 20%. A nonwoven fabric having a weight of 300 g/m$^2$, consisting of polyester fibers, was impregnated with this water-borne urethane resin composition and then squeezed by a mangle so that a wet pick-up becomes 250%. The nonwoven fabric impregnated with the water-borne urethane resin composition was allowed to stand in saturated water vapor at 100° C. for two minutes and then dried in a drier at 100° C. for 20 minutes.

Example 6

Processing was carried out in the same manner as in Example 5, except that a water-borne urethane resin D was used.

Example 7

Processing was carried out in the same manner as in Example 5, except that RW-8W (manufactured by Rohm and Haas, Ltd.) was used as an associated type thickener.

Example 8

Processing was carried out in the same manner as in Example 5, except that RW-2020NPR (manufactured by Rohm and Haas, Ltd.) was used as an associated type thickener.

Example 9

Processing was carried out in the same manner as in Example 5, except that ADEKANOL UH-420 (manufactured by ASAHI DENKA KOGYO KK) was used as an associated type thickener.

Example 10

Processing was carried out in the same manner as in Example 5, except that COLLACRAL PU-85 (manufactured by BASF Inc.) was used as an associated type thickener.

Example 11

Processing was carried out in the same manner as in Example 5, except that BORCHEGEL L75N (manufactured by Hoechst AG) was used as an associated type thickener.

Comparative Example 4

Processing was carried out in the same manner as in Example 5, except that VONDIC 1850NS (DAINIPPON INK & CHEMICALS Co., Ltd., heat-sensitive coagulation temperature of 100° C. or higher) was used as an associated type thickener.

Comparative Example 5

Processing was carried out in the same manner as in Example 5, except that no associated type thickener was added.

Comparative Example 6

50 Parts of a water-borne urethane resin C was mixed with an aqueous solution prepared by previously dissolving 2 parts of an alkali-soluble acrylic thickener VONCOAT HV (DAINIPPON INK & CHEMICALS Co., Ltd.) in 47 parts of water and further adding 1 part of 28% ammonia water thereby thickening the solution to prepare a water-borne urethane resin composition, and then processing was carried out in the same manner as in Example 5.

Comparative Example 7

A nonwoven fabric having a weight of 300 g/m$^2$, consisting of polyester fibers, was impregnated with the water-borne urethane resin composition of Example 5 and then squeezed by a mangle so that a wet pick-up becomes 250%. The nonwoven fabric impregnated with the water-borne urethane resin composition was allowed to stand in a drier at 150° C. for two minutes and then dried in a drier at 100° C. for 20 minutes.

These evaluation results are shown in the following tables.

TABLE 3

|  | Example 5 | Example 6 | Example 7 | Example 8 |
|---|---|---|---|---|
| Water-borne urethane resin | Synthesis Example C | Synthesis Example D | Synthesis Example C | Synthesis Example C |
| Heat-sensitive coagulation temperature (° C.) | 52 | 60 | 52 | 52 |
| Thickener | N62 | N62 | RM-8W | RM-2020NPR |
| Coagulation method | steam | steam | steam | steam |
| Presence or absence of migration | ○ | ○ | ○ | ○ |
| Formation of porous layer | ○ | ○ | ○ | ○ |
| Feel of processed cloth | ◎ | ◎ | ○ | ○ |

TABLE 4

|  | Example 9 | Example 10 | Example 11 |
|---|---|---|---|
| Water-borne urethane resin | Synthesis Example C | Synthesis Example C | Synthesis Example C |
| Heat-sensitive coagulation temperature (° C.) | 52 | 52 | 52 |
| Thickener | UH-420 | PU-85 | L75N |
| Coagulation method | steam | steam | steam |
| Presence or absence of migration | ○ | ○ | ○ |
| Formation of porous layer | ○ | ○ | ○ |
| Feel of processed cloth | ◎ | ○ | ○ |

TABLE 5

|  | Comp. Example 4 | Comp. Example 5 | Comp. Example 6 | Comp. Example 7 |
|---|---|---|---|---|
| Water-borne urethane resin | 1850NS | Synthesis Example C | Synthesis Example C | Synthesis Example C |
| Heat-sensitive coagulation temperature (° C.) | >100 | 52 | 52 | 52 |
| Thickener | N62 | none | HV/ammonia | N62 |
| Coagulation method | steam | steam | steam | hot air |
| Presence or absence of migration | x | ○ | ○ | ○ |
| Formation of porous layer | x | x | x | x |
| Feel of processed cloth | x | Δ | x | x |

<Evaluation Procedure>
Presence or Absence of Migration:

The degree of filling of the urethane resin was visually observed using a transmission electron micrograph of a cross section of the processed cloth according to the following criteria.

<Assessment>
○: observed no migration, uniformly filled condition
X: observed some migration, non-uniformly filled condition Formation of microporous layer:

It was visually observed using a transmission electron micrograph whether or not a microporous layer is formed on the surface of the filled urethane resin according to the following criteria.

○: observed some microporous layer
X: observed no microporous layer

Feel of processed cloth:

The processed cloth was evaluated by touch-feeling according to the following criteria.

<Assessment>
◎: particularly excellent feel of elasticity and genuineness
○: ordinary feel of elasticity and genuineness
Δ: slightly poor feel of-elasticity and genuineness
X: neither feel of elasticity nor genuineness From the Examples and Comparative Examples described above, it has been confirmed that it is possible to obtain a processed cloth (fibrous sheet-like composite) wherein the water-borne urethane resin composition of the present invention has excellent standing stability and is capable of being uniformly filled into a fibrous material substrate without causing migration due to heat-sensitive coagulation, forming a micrporous layer after drying and imparting a feel equivalent to that obtained in a solvent-based urethane resin composition, i.e., an elastic and genuine feel.

The fibrous sheet-like composite can be realized only by a combination of (i) impregnation or coating of a fibrous material substrate with, (ii) a water-borne resin composition comprising a water-borne urethane resin having a specific heat-sensitive coagulation temperature and an associated type thickener, and (iii) followed by heat-sensitive coagulation of the water-borne resin composition coating with steam. It has been confirmed that an object of the present invention cannot be attained if the present invention lacks any one of these constituent factors.

Industrial Applicability

The water-borne urethane resin composition of the present invention comprises (1) a water-borne urethane resin having a specific heat-sensitive coagulation temperature and (2) an associated type thickener so that the water-borne urethane resin composition is stable at normal temperatures and has well-defined heat-sensitive coagulation properties, and is capable of being uniformly filled into a fibrous material substrate without causing migration, forming a micrporous layer after drying and imparting a feel equivalent to that obtained in a solvent-based urethane resin composition, i.e., an elastic feel, by impregnating or coating the fibrous material substrate with the water-borne urethane resin composition. Consequently, the water-borne urethane resin composition of the present invention is suited for use in a fibrous material substrate, especially an artificial leather.

The fibrous sheet-like composite obtained by the present invention has the following very excellent characteristics. That is, migration does not occur because the urethane resin composition has well-defined heat-sensitive coagulation properties when coagulated with steam and, furthermore, the urethane resin composition is uniformly filled into the space between fibers by heat-sensitive coagulation and is capable of forming a microporous layer after drying and also imparting a feel equivalent to that obtained in a solvent-based urethane resin composition, i.e., an elastic and genuine feel.

What is claimed is:

1. A water-borne urethane resin composition for forming a microporous layer, comprising (1) a water-borne urethane resin having a heat-sensitive coagulation temperature of 40 to 90° C. and (2) an associative type thickener, wherein said water-borne urethane resin (1) comprises (A) a polyoxyalkylene glycol comprising at least 50% by weight or more of a repeating unit of ethylene oxide and/or (B) a polyoxyalkylene glycol monoalkylether, a polvoxvalkylene glycol component of said polvoxyalkylene glycol monoalkylether comprising at least 50% by weight or more of a repeating unit of ethylene oxide, and said associative type thickener (2) has a hydrophobic group located at at least one terminal and also has a urethane bond in its molecular chain.

2. A water-borne urethane resin composition for forming a microporous layer as claimed in claim 1, wherein said water-borne urethane resin (1) is a urethane resin having a softening temperature of 120 to 240° C.

3. A water-borne urethane resin composition for forming a microporous layer as claimed in claim 1, wherein said water-borne urethane resin (1) is a water-borne urethane resin comprising an average particle diameter of 0.1 to 5 $\mu$m.

4. A water-borne urethane resin composition for forming a microporous layer as claimed in claim 1, wherein said water-borne urethane resin composition further comprises a nonionic emulsifier having HLB of 10 to 18, wherein said water-borne urethane resin (1) is a water-borne urethane resin dispersed with said nonionic emulsifier.

5. A water-borne urethane resin composition for forming a microporous layer as claimed in claim 4, wherein said nonionic emulsifier has a structure represented by the following structural formula (I):

$$Ra\text{—}Ph\text{—} \qquad (I)$$

wherein R is a $C_1$ to $C_9$ alkyl, aryl or alkylaryl group; a represents an integer of 1 to 3; and Ph represents a phenyl ring residue.

6. A water-borne urethane resin composition for forming a microporous layer as claimed in claim 1, wherein said associative type thickener (2) has a structure represented by the following structural formula (I):

$$Ra\text{—}Ph\text{—} \qquad (I)$$

wherein R is a $C_1$ to $C_9$ alkyl, aryl or alkylaryl group; a represents an integer of 1 to 3; and Ph represents a phenyl ring residue.

* * * * *